Figure 1:
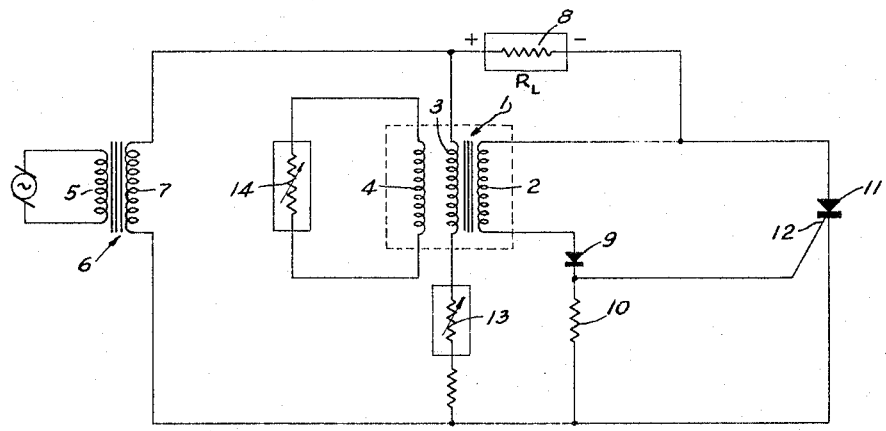

INVENTORS
WILLIAM J. MAHONEY.
NANJUNDIAH N. MURTHY.

BY

ATTORNEY

INVENTORS
WILLIAM J. MAHONEY
NANJUNDIAH N. MURTHY

ATTORNEYS

United States Patent Office 3,269,933
Patented August 30, 1966

3,269,933
ELECTRODIALYSIS APPARATUS FOR DESALINIZATION OF FLUIDS HAVING AUTOMATIC CURRENT CONTROL MEANS
William J. Mahoney, Darien, and Nanjundiah N. Murthy, Cos Cob, Conn., assignors to American Machine & Foundry Company, a corporation of New Jersey
Filed Mar. 17, 1961, Ser. No. 96,453
11 Claims. (Cl. 204—301)

This invention relates to apparatus for continuously treating fluids to accomplish a desired change therein and particularly to apparatus of this type which is capable of automatic operation in such fashion that, as to the characteristic of the fluid changed by the treatment, the product is substantially constant or uniform throughout the time period of treatment.

In many commercial applications, it is desirable to treat a fluid continuously in order to obtain a desired change therein. Success of the treatment frequently depends largely on effecting the treatment with such precise and continuous control that, even though the nature of the feed may vary considerably during the total period, the product stream is uniform with respect to the characteristic or characteristics changed by the treatment. The fluid is passed through a treating zone having a small volumetric capacity compared to the total amount of fluid treated during a period time. Various types of fluids may be treated, and the treatment may be electro-chemical, chemical or physical, depending upon the particular application. In a more or less typical application, and one in which the invention offers special advantages, salt water or brackish water is passed continuously through an electrodialysis device to accomplish removal of salt. The invention will be described with particular reference to this application.

In the use of an electrodialysis stack or equivalent device for continuous removal of salt from water (hereinafter referred to as desalinization) in controlled fashion, a number of problems are encountered. One major problem arises because the electrodialysis stack operates relatively slowly, requiring a substantial residence time for the liquid in the electrodialysis stack. If control is accomplished in response to the feed water, the response is too early, while response to the product water gives a control action which lags the condition requiring it. Another problem arises because the efficiency of electrodialysis devices decreases as the temperature of the liquid being treated decreases. A further problem is encountered when devices such as conductivity cells are employed as the means for sensing the salt content of the water being treated. If such sensing devices are employed with direct current, or with polarity unbalanced alternating current, ionization of the liquid occurs at the electrodes of the sensing device so that bubbles form on the electrode surfaces and cause ambiguous responses. While more or less satisfactory solutions for such problems have been provided in large scale commercial equipment, where elaborate and relatively expensive systems and devices can be economically justified, no suitable equipment has yet been proposed for relatively small home and rural installations.

A general object of the invention is to provide apparatus capable of continuously and automatically treating a fluid to accomplish a desired change therein in such controlled fashion that the characteristic of the fluid affected by the change is held substantially constant in the product fluid throughout the time period of treatment.

Another object is to devise an apparatus of the type referred to, employing improved control means responding to both the condition of the feed and the condition of the product in such manner that effective control is accomplished despite the fact that the fluid being treated may have a substantial residence time in the treating zone.

A further object is to provide a fluid treating apparatus of the type described which provides a uniform product despite variations in temperature of the fluid feed.

Yet another object is to devise an apparatus for automatically treating liquids and embodying a conductivity cell or the like for control purposes, the apparatus being free from spurious control effects caused by ionization of the liquid at the electrodes of the conductivity cell.

A still further object is to devise a relatively simple and inexpensive apparatus for desalination of water which is practical for use in homes and other relatively small scale applications.

Figure 2:
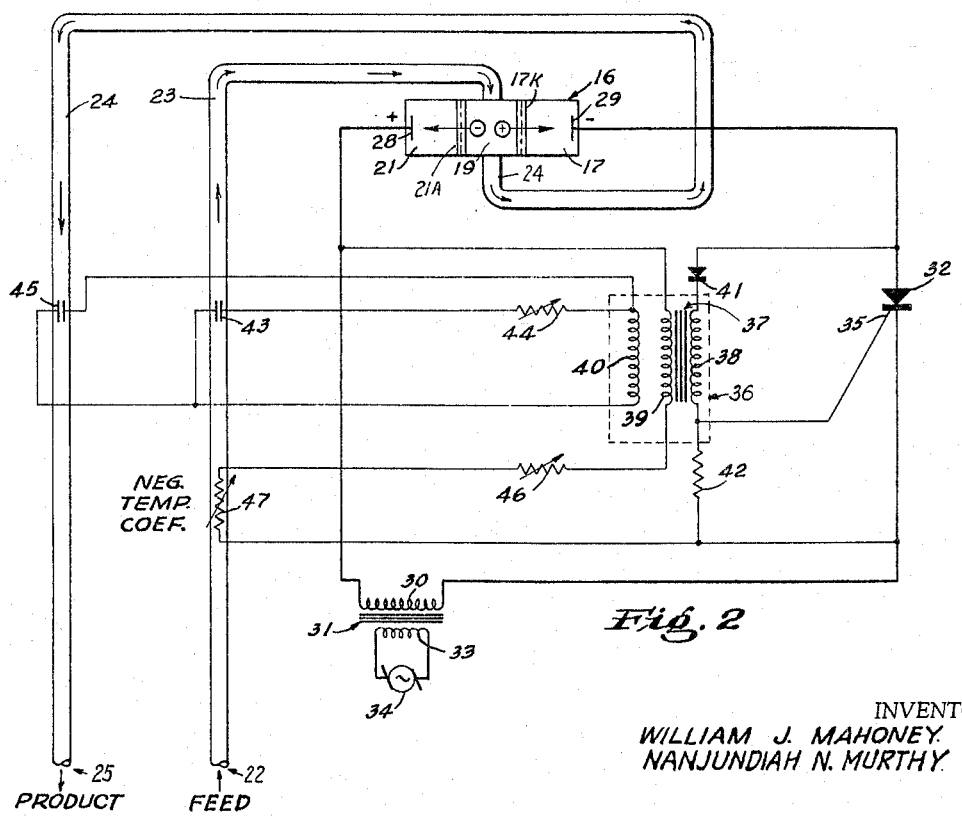
Figure 4:
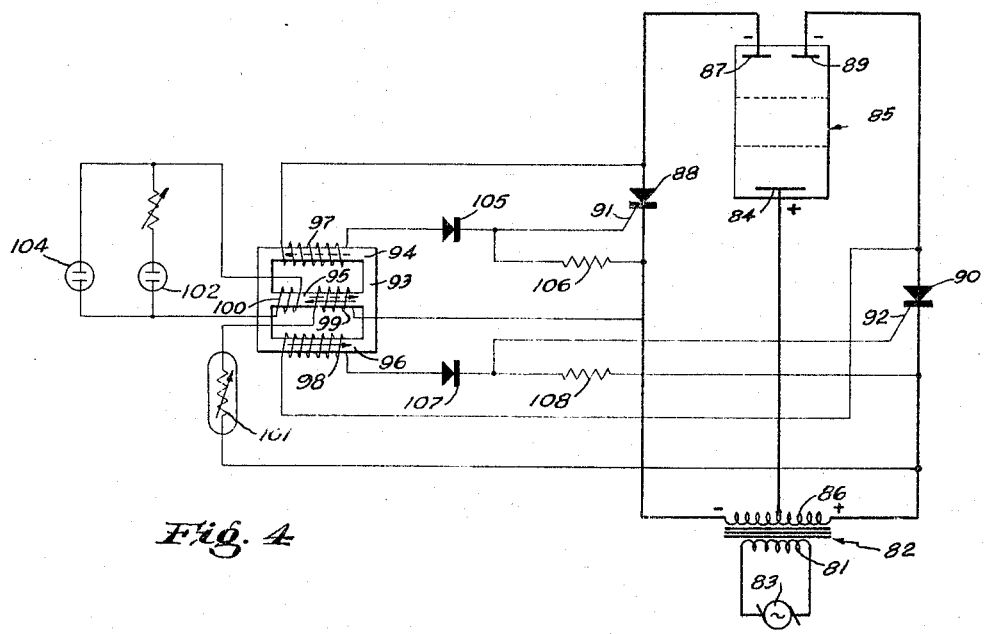
Figure 3:
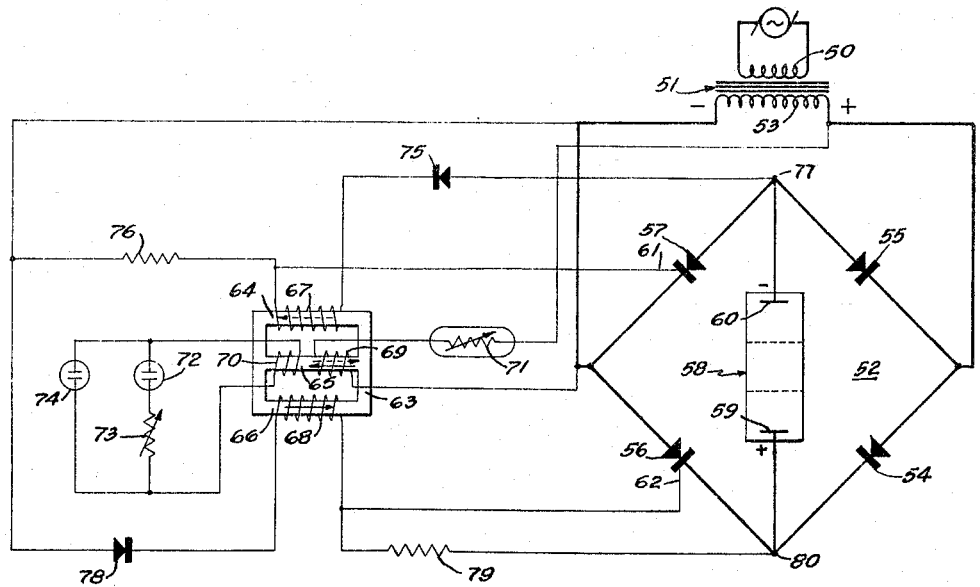

In order that the manner in which these and other objects are attained in accordance with the invention can be understood in detail, reference is made to the accompanying drawings, which form a part of this specification, and wherein:

FIG. 1 is a schematic diagram representative of electrical systems employed in accordance with the invention, and FIGS. 2–4 are schematic diagrams of fluid treating apparatus constructed in accordance with three typical embodiments of the invention.

In accordance with the invention, a saturable reactor is employed to provide a gating signal to a controlled diode, such as a silicon diode, which in turn is used to control the quantity of current delivered to a load device, typically an electrodialysis stack. The firing angle of the signal developed by the saturable reactor is controlled by a circulating current control circuit which exercises inverse control over the degree of core reset. A resistance controlled bias circuit, connected to an A.C. source, is also employed and achieves direct control over the degree of core reset. A saturable reactor device constructed in this manner is ideal for control of chemical apparatus and particularly electrochemical and electrolysis equipment. The current in the circulating current control circuit is basically alternating current and therefore will not ionize the fluid when connected to the conductivity cell or the like for sensing characteristics of the liquid. The circuit can also easily be made to compensate for temperature, for example, by connecting a suitably located thermistor into the bias winding circuit.

With a saturable reactor of the type described, it is possible to connect several conductivity cells in parallel within the control circuit. In accordance with the invention, one conductivity cell is placed in the feed line, to measure conductivity of water entering the treatment device, and a second conductivity cell is placed in the product water line to sense the conductivity of the treated water leaving the treatment device. By combining a first measurement, taken too early for control purposes, with a second measurement, taken too late for control purposes, an additive result is achieved which is essentially proper for accomplishing accurate control of the treatment.

FIG. 1 illustrates in generalized fashion a typical electrical system constructed in accordance with the invention for powering in accurately and continuously controlled fashion various types of electrically operated fluid treating apparatus. The circuit includes a saturable core 1, which may be of any soft iron material or the like and, specifically, need not be of rectangular hysteresis loop material. A load winding 2, a bias winding 3 and a control winding 4 are wound about the core.

The primary winding 5 of transformer 6 is connected to a suitable source of A.C. power. Load winding 2 is connected to one end of the secondary winding 7 via the load impedance 8 and to the other end of secondary winding 7 via diode 9 and resistance 10. A silicon controlled diode 11 is connected in parallel with the series combination of load winding 2, diode 9 and resistance 10. The control element 12 of silicon control diode 11 is connected to the junction between diode 9 and resistance 10. Bias winding 3 is connected directly to one end of secondary winding 7 and to the other end of secondary winding 7 via variable control resistance 13. A variable control resistance 14 is directly connected to the ends of control winding 4.

During a first positive half cycle of current from the A.C. source, diode 9 permits current to flow through load winding 2, driving core 1 into saturation. During the subsequent negative half cycle, current flows through bias winding 3, creating a flux in core 1 in a direction desaturating or resetting the core. Variable resistance 13 controls the quantity of current flowing through the bias winding and therefore exercises inverse control over the quantity of core reset since an increase in resistance causes a decrease in current and a decrease in reset. Variable resistance 14, because of the reflected impedance in bias winding 3 by virtue of the transformer action between bias winding 3 and control winding 4, exercises direct control over the quantity of reset. A decrease in resistance 14 results in an attempt to increase the current flow through bias winding 3, creating a larger potential drop across resistance 13 and hence a net potential decrease across bias winding 3 and therefore a decrease in reset. Accordingly, variable resistance 13 exercises an inverse control over the reset while variable resistance 14 exercises a direct control over the reset.

During the subsequent positive half cycle, diode 9 permits current flow through load winding 2, driving core 1 into saturation, the effect of the bias and control windings being negligible. Prior to reaching saturation, the impedance of load winding 2 is high, so that there is virtually no potential drop across load impedance 8 or resistance 10. Once core 1 becomes saturated, however, the impedance of load winding 2 drops to a relatively low value, causing a significant increase in potential across resistance 10. The potential developed across resistance 10 is applied directly between the cathode and control element of controlled diode 11 and is sufficient to render controlled diode 11 conductive. When the controlled diode conducts, it effectively shunts winding 2 and places the load impedance 8 directly across secondary winding 7 for the remaining portion of the positive half cycle, the voltage drop across the controlled diode itself being less than one volt. The portion of the positive half cycle during which the controlled diode is rendered conductive is controlled by the firing angle or degree of reset of the saturable reactor 1 which, in turn, is controlled by variable resistances 13 and 14.

FIG. 2 is a schematic diagram showing a magnetic control circuit according to this invention employed in conjunction with a water purifying unit, of the electrodialysis type, for removing anions and cations from brackish water, for example. The electrodialysis stack shown diagrammatically at 16 is of conventional construction. For simplicity it is shown as a three compartment cell, but a plurality of membranes and compartments may be used and in each compartment only one membrane need be ion selective.

The illustrated cell is comprised of an anode 28 and a cathode 29 housed within positive and negative electrode compartments 21 and 17, respectively. The electrode compartments are bounded by an anion selective membrane 21A and a cation selective membrane 17K, the space between these membranes defining a dialyzing compartment 19. Thus, brackish water entering and leaving compartment 19 through feed and product lines 23 and 24, respectively, is purified while passing through the compartment 19 due to the migration of ions through the membranes 21A and 17K into the electrode compartments under the influence of the direct current potential between the electrodes 28 and 29. Anions migrate through the membrane 21A into the positive electrode compartment 21, and cations migrate through the membrane 17K into the negative electrode compartment 17. The electrode compartments may be hydraulically washed (not shown) by continuously flowing waste liquid in series through said electrode compartments to remove constituents collected in the compartments. A separate feed of brackish water is suitable for this purpose.

The rate at which anions and cations are removed from compartment 19 depends upon the quantity of current flowing between cathode 29 and anode 28. Anode 28 is directly connected to one end of secondary winding 30 of transformer 31. Cathode 29 is connected to the other end of secondary winding 30 via controlled diode 32. Primary winding 33 of transformer 31 is connected to a suitable source of alternating current 34. The quantity of current flowing through electrodialysis stack 16 is determined by the gating signal applied to the control element 35 of controlled diode 32.

The magnetic control unit 36 is substantially the same as that described in FIG. 1 and includes a magnetic core 37 constructed from any suitable magnetic material with load winding 38, bias winding 39 and control winding 40 wound thereon. Load winding 38 is connected to cathode 29 via diode 41 and to secondary winding 30 via resistance 42. The control element 35 of the controlled diode is connected to the junction between resistance 42 and load winding 38. During the half cycle in which diode 41 permits current to flow, current is first consumed in saturating magnetic core 37 and thereafter produces an output potential across resistance 42. The signal appearing across resistance 42 has a variable firing angle and is used as a gating signal for controlled diode 42 to control the amount of current flowing through the electrodialysis stack 16.

Conductivity cell 43, located in feed water line 23, is connected across control winding 40 via variable resistance 44. Conductivity cell 45, located in product water line 25, is connected directly across control winding 40 in parallel with conductivity cell 43. Bias winding 39 is connected directly to one end of secondary winding 30 and to the other end of secondary winding 33 via variable resistances 46 and 47.

If there is an increase in the quantity of anions and cations present in the feed water passing through conductivity cell 43, the resistance of the conductivity cell decreases, increasing the reset of core 37 and advancing the firing angle of the gating signal applied to control element 35 to permit more current to flow through electrodialysis stack 16 in order that the increased quantity of anions and cations present in the feed water can be removed. Similarly, if the quantity of anions and cations in the feed water decreases, the current flow through electrodialysis stack is caused to decrease to a level commensurate with the lower concentration of anions and cations. Resistance 44 is employed to reduce the sensitivity of conductivity cell 43 and thus attenuates the signal derived therefrom. Conductivity cell 45, in like manner, causes increases and decreases in the current flow through the electrodialysis stack 16 in accordance with the quantity of cations and anions sensed in the product water. The advantage of employing before and after sensing, i.e., sensing the conductivity of the feed water and conductivity of the product water, enables the control unit to respond to changes in feed water composition as well as to deviation of the product water composition from a desired norm. This sensing technique is very significant, since the time required for water to pass through electrodialysis stack 16 may be on the order of several minutes and therefore, if only the feed water were sensed, the control unit would correct several minutes too soon or, conversely, if only the product water were sensed, the control unit would react several minutes too late.

Resistance 47, connected electrically in series with bias winding 39 and placed physically in the feed water line 23, is thermally variable and has a negative temperature coefficient of resistance. Accordingly, as the temperature of the feed water decreases, the resistance 47 increases, resulting in decreased reset, an advance in the firing angle of the signal applied to controlled diode 32, and thus an increase in current through electrodialysis stack 16. This increase in current compensates for the decreased efficiency of the electrodialysis stack at lower feed water temperatures.

A full wave embodiment of the electrical system employed in accordance with the invention is shown in FIG. 3. Primary winding 50 of transformer 51 is connected to a suitable source of alternating current. A diode bridge, including diodes 54 and 55 and controlled diodes 56 and 57 arranged in a conventional bridge configuration, is connected across secondary winding 53 to deliver full wave rectified power at the bridge output. An electrochemical device, such as electrodialysis stack 58, is connected across the output terminals 77 and 80 of bridge 52. During the half cycle when the polarities on secondary winding 53 are as shown in the diagram, current flows from the positive side of secondary winding 53 through diode 54, electrodialysis stack 58 (from anode 59 to cathode 60) and controlled diode 57 to the negative side of winding 53, provided sufficient potential is applied to control element 61 of the controlled diode. On the subsequent half cycle, when the polarity is reversed, current flows through controlled diode 56, electrodialysis cell 58 (from anode 59 to cathode 60), and diode 55 to the other side of secondary winding 53, provided a sufficient gating signal is applied to control element 62 of the controlled diode. Thus, full wave rectified power is delivered to the electrodialysis cell 58 in a quantity controlled by the gating signals supplied to control elements 61 and 62.

The circuit employed to develop the gating signals for the controlled diodes includes magnetic core 63, constructed of any suitable magnetic material and including legs 64, 65 and 66. A load winding 67 is wound about leg 64, and a load winding 68 is wound about leg 66. A bias winding 69 and a control winding 70 are wound about leg 65.

Bias winding 69 is connected across secondary winding 53 in series with a variable temperature responsive impedance 71. Impedance 71 is located in the feed water line to the electrodialysis stack and serves essentially the same function as does impedance 47 in FIG. 2. Conductivity cell 72 is located in the feed water line to the electrodialysis stack and is connected in series with a variable resistance 73 across control winding 70. Conductivity cell 74 is located in the product water line from the electrodialysis cell and is similarly connected across control winding 70. Conductivity cells 72 and 74 provide before and after sensing control as previously described in connection with conductivity cells 43 and 45 in FIG. 2. Current flow through bias winding 69 as controlled by impedance 71 and the loading effect of circulating current flow through the conductivity cells, controllably resets the magnetic material in legs 64 and 66 during the half cycle when the respective load windings 67 and 68 do not carry current.

Load winding 67 is connected to bridge output terminal 77 via diode 75 and to one end of secondary winding 53 via resistance 76. During the half cycle when the polarity on secondary winding 53 is as shown, current flows from the secondary winding through diode 54, electrodialysis stack 58, diode 75, load winding 67, resistance 76 and to the other end of secondary winding 53. As current begins to flow, power is first consumed by the magnetic core to overcome the reset state of leg 64, thus creating a relatively large potential drop across load winding 67. Subsequent to saturation of leg 64, the potential drop across the load winding decreases, resulting in an increased potential drop across resistance 76. The time required to reach saturation depends upon the degree of reset in leg 64 and therefore the signal appearing across resistance 76 has a variable firing angle. Control element 61 is connected directly to resistance 76 so that the signal appearing across resistance 76 may be used to gate controlled diode 57.

Load winding 68 is connected to terminal 80 of bridge 52 via resistance 79 and to one end of secondary winding 53 via diode 78. During the half cycle when the polarity on secondary winding 53 is opposite to that shown, current flows from the secondary winding through diode 78, load winding 68, resistance 79, electrodialysis stack 58, diode 55 and to the other end of secondary winding 53. During this half cycle, the flux created by current flow through winding 68 overcomes the degree of reset in leg 66 and develops a signal having a variable firing angle across resistance 79. Control element 62 is connected to resistance 79 so that this signal can be employed as a gating signal for controlled diode 56.

Another embodiment of the electrical system employed in the invention is shown schematically in FIG. 4. Primary winding 81 of transformer 82 is connected to a suitable A.C. source 83. Anode 84 of a dual cathode electrodialysis stack 85 is connected directly to the center tap of secondary winding 86. Cathode 87 of electrodialysis stack 85 is connected to one end of secondary winding 86 via controlled diode 88. Cathode 89 of electrodialysis stack 85 is connected to the other end of secondary winding 86 via controlled diode 90. During the half cycle when the polarity at secondary winding 86 is as shown, current flows from the center tap through the electrodialysis stack (from anode 84 to cathode 87) and through controlled diode 88 back to the secondary winding, provided a sufficient gating signal is present on control element 91. Similarly, during the subsequent half cycle, when the polarity on secondary winding 86 reverses, current flows from the center tap of winding 86 through the electrodialysis stack (from anode 84 to cathode 89), and through controlled diode 90 back to the secondary winding, providing a sufficient gating signal is present on control element 92.

The control circuit which provides the gating signals for control elements 91 and 92 includes a saturable core 93 having legs 94, 95 and 96. Load winding 97 is wound about leg 94 and load winding 98 about leg 96. Bias winding 99 and a control winding 100 are wound about the central leg 95.

Bias winding 99 is connected across secondary winding 86 via variable impedance 101. Impedance 101 is a thermally responsive negative temperature coefficient impedance placed in the feed water line. Conductivity cell 102, located in the feed water line, is connected across control winding 100 via variable resistance 103. Conductivity cell 104, located in the product water line, is connected across control winding 100 in parallel with conductivity cell 102. Bias winding 99 and control winding 100, along with their respective circuit components, operate to establish reset levels in legs 94 and 96 in essentially the same manner as similar components establish the reset levels in legs 64 and 66 of FIG. 3.

One end of load winding 97 is connected to cathode 87 while the other end is connected to secondary winding 86 via diode 105 and resistance 106. Thus, during the half cycle when the polarity on secondary winding 86 is as shown, current flows through electrodialysis stack 85, load winding 97, diode 105, resistance 106 back to the secondary winding. Control element 91 is connected to the junction between diode 105 and resistance 106. Therefore, the variable firing angle signal developed across resistance 106 is effective as a gating signal for the controlled diode.

One end of load winding 98 is connected directly to cathode 89, while the other end is connected to secondary winding 86, via diode 107 and resistance 108. During the half cycle when the polarity on secondary winding 86 is reversed from that shown, current flows from the center tap of winding 86 through the electrodialysis stack 85, load winding 98, diode 107, resistance 108 to secondary winding 86. Control element 92 is connected to the junction between diode 107 and resistance 108 and therefore the signal developed across resistance 108 is effective as a gating signal for controlled diode 90.

It will be noted that, in the embodiments of FIGS. 2–4, the electrodialysis device and the alternating current-controlled saturable reactor means, acting through a controlled diode, are specifically inter-related to accomplish satisfactory continuous treatment of the water or other fluid in a manner not heretofore achieved in the art. Since the saturable reactor embodies two separate alternating current control features, all of the control functions required for a desalinator, for example, are accomplished in a manner which is both simple and dependably accurate. Thus, the bias circuit employs a thermally responsive impedance to sense feed temperature, and operates to effect the desired control for temperature compensation without involving auxiliary circuits or apparatus. Use of the conductivity cells, connected in parallel across the control winding, makes it possible to employ a before-and-after sensing technique. The induced alternating current flow in the control winding makes it possible to connect the conductivity cells directly to the control circuit so that ionization at the electrodes of the cells is avoided and conversion circuits are unnecessary. These features are pointed out in more particularity in the appended claims.

We claim:

1. In a liquid treating apparatus, the combination of an electrochemical device through which liquid to be treated can be passed, said device being operative to treat liquid in accordance with the energizing current supplied to the device; an energizing circuit connectable to an A.C. source, said energizing circuit being connected to said electrochemical device to supply D.C. energizing current thereto and including a controlled diode operative to control the quantity of said D.C. energizing current in response to a gating signal applied to the control element of the diode; saturable reactor means connected to said control element to supply such gating signal; control circuit means operatively connected to said saturable reactor means to control the gating signal supplied thereby; and variable impedance means connected in said control circuit means to limit the alternating curent in said control circuit means.

2. An apparatus in accordance with claim 1 and wherein said variable impedance means comprises a conductivity cell disposed in contact with the liquid.

3. An apparatus in accordance with claim 1 and wherein said variable impedance means comprises a first sensing means arranged to respond to a given characteristic of the feed liquid supplied to said electrochemical device and a second sensing means arranged to respond to said characteristic of the product liquid from said electrochemical device, said first and second sensing means being connected in parallel.

4. In a liquid treating apparatus, the combination of an electrochemical device through which liquid to be treated can be passed, said device being operative to treat liquid in accordance with the energizing current supplied to the device; two controlled diodes both connected to said electrochemical device and connectable to a source of alternating current, said diodes being poled to be operative to energize said electrochemical device on alternate half cycles of the alternating current from the source; a saturable reactor device including first and second load windings connected each to the control element of a different one of said controlled diodes and each operative to provide a gating signal to control the current passing through the controlled diode connected thereto; and a control circuit including variable impedance means and operatively connected to said saturable reactor device to control the firing angle of said gating signals in accordance with the value of said impedance means.

5. An apparatus in accordance with claim 4 and wherein said variable impedance means comprises a conductivity cell disposed in contact with the liquid and connected to limit the induced current in said control circuit.

6. An apparatus in accordance with claim 4 and wherein said variable impedance means comprises a first sensing means arranged to respond to a given characteristic of the feed liquid supplied to said electrochemical device and a second sensing means arranged to respond to the same characteristic of the product liquid from said electrochemical device, said first and second sensing means being connected in parallel.

7. In an apparatus for removing ions from an electrolyte solvent, the combination of an electrodialysis device through which the electrolyte to be treated can be passed in continuous flow; a D.C. energizing circuit connected to said electrodialysis device and connectable to an alternating current source, said D.C. energizing circuit including means for translating alternating current into direct current to apply D.C. potential to said electrodialysis device; a saturable magnetic core; a load winding operatively disposed relative to said core; an alternating current circuit including said load winding, the amount of current passing through said load winding depending upon the state of magnetic saturation of said core, said load winding being connected to control the current in said D.C. energizing circuit; a bias winding and a control winding both operatively disposed relative to said core; a thermally responsive impedance disposed to be affected by the temperature of the electrolyte; an alternating current bias circuit including said bias winding and said thermally responsive impedance and operative to limit current in said bias winding in accordance with the temperature of the electrolyte and so accomplish control of the degree of reset of said core; and conductivity sensing variable impedance means disposed to sense the conductivity of the electrolyte and connected electrically across said control winding to limit current in said control winding and so control the degree of reset of said core in accordance with conductivity of the electrolyte.

8. An apparatus in accordance with claim 7 and wherein said variable impedance means includes a first conductivity cell disposed to sense the conductivity of feed electrolyte supplied to said electrodialysis device, and a second conductivity cell disposed to sense the conductivity of product electrolyte from said electrodialysis device, said first and second conductivity cells being connected in parallel.

9. An apparatus in accordance with claim 7 wherein said means for translating alternating current into direct current includes a controlled diode connected in said energizing circuit to control the energizing current supplied to said electrodialysis device, said load winding being connected to supply a gating signal to the control element of said diode in accordance with the degree of reset of said core as determined jointly by said bias and control windings.

10. An electrodialysis apparatus for removing ions from an electrolyte solvent comprising, an electrodialysis cell having positive and negative electrodes, a magnetic core, an alternating current load circuit connectable to a source of A.C. and comprising a load winding operatively associated with said core, said load circuit being connected to said electrodes, and including means for translating alternating current into direct current to apply a D.C. potential to said electrodes, a control winding operatively associated with said core and in which alternating currents are induced, and a conductivity cell disposed to be in contact with said electrolyte, said conductivity cell being connected across said control winding to control the magnitude of alternating current in said control winding and to thereby control the magnitude of D.C. current applied to said electrodes.

11. An apparatus in accordance with claim 10 and further comprising a bias winding operatively associated with said core, and an alternating current circuit connected to said bias winding and including a thermally variable impedance, said impedance being disposed to respond to the temperature of the feed liquid flowing to said treating device.

References Cited by the Examiner

UNITED STATES PATENTS

| | | | |
|---|---|---|---|
| 1,388,613 | 8/1928 | Simsohn | 204—229 |
| 2,443,599 | 6/1948 | Chester | 204—228 |
| 2,586,169 | 2/1952 | Kline | 324—30 |
| 2,617,766 | 11/1952 | Emmett et al. | 324—30 |
| 2,621,673 | 12/1952 | Hodgens | 324—30 |
| 2,626,620 | 1/1953 | Smith | 324—30 |
| 2,734,858 | 2/1956 | Bachman et al. | 204—211 |
| 2,752,306 | 6/1956 | Juda | 204—231 |
| 2,852,453 | 9/1958 | Housner | 204—228 |
| 2,860,092 | 11/1958 | Rosenberg | 204—180 |
| 2,933,444 | 4/1960 | Bott | 204—301 |
| 2,937,126 | 5/1960 | Rosenberg | 204—180 |
| 2,943,989 | 7/1960 | Kollsman | 204—301 |
| 2,981,671 | 4/1961 | Griffiths | 204—180 |

OTHER REFERENCES

Electronic Design, November 11, 1959, page 168.

Frenzel et al.: "Solid State Thyratron Switches Kilowatts," Electronics, March 28, 1958.

De Whalley: Chemistry and Industry, Jan. 4, 1958, pages 8–13.

Wilson: Demineralization by Electrodialysis, pages 325–331, 1960.

JOHN H. MACK, *Primary Examiner.*

JOHN R. SPECK, MURRAY TILLMAN, WINSTON A. DOUGLAS, *Examiners.*

G. KAPLAN, J. BATTIST, L. G. WISE,
*Assistant Examiners.*